US011019111B2

(12) United States Patent
Wikoff et al.

(10) Patent No.: US 11,019,111 B2
(45) Date of Patent: May 25, 2021

(54) AUTOMATED IPV4-IPV6 SELECTION FOR VOICE NETWORK ELEMENTS

(71) Applicant: Comcast Cable Communications, LLC, Philadelphia, PA (US)

(72) Inventors: Richard Wikoff, Yardley, PA (US); Raghavendra P. Hegde, Wayne, PA (US); Matthew J. Christopher, Highlands Ranch, CO (US); Eugene Nolan, Chalfont, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 61 days.

(21) Appl. No.: 16/205,516

(22) Filed: Nov. 30, 2018

(65) Prior Publication Data

US 2020/0177641 A1 Jun. 4, 2020

(51) Int. Cl.
*H04L 29/06* (2006.01)
*H04L 29/12* (2006.01)

(52) U.S. Cl.
CPC ........ *H04L 65/1046* (2013.01); *H04L 61/157* (2013.01); *H04L 61/251* (2013.01); *H04L 65/1006* (2013.01); *H04L 65/1033* (2013.01); *H04L 65/1073* (2013.01)

(58) Field of Classification Search
CPC ................................................. H04L 59/3009
See application file for complete search history.

(56) References Cited

U.S. PATENT DOCUMENTS

| 6,118,784 | A | 9/2000 | Tsuchiya et al. |
| 2002/0021703 | A1* | 2/2002 | Tsuchiya ................. H04L 12/66 370/401 |
| 2008/0137832 | A1* | 6/2008 | Heinze ................ H04L 29/1216 379/220.01 |
| 2009/0161854 | A1* | 6/2009 | Ku ..................... H04M 3/42017 379/207.16 |
| 2018/0191786 | A1* | 7/2018 | Kunz .................. H04L 65/1016 |

* cited by examiner

*Primary Examiner* — Ario Etienne
*Assistant Examiner* — S M Z Islam
(74) *Attorney, Agent, or Firm* — Banner & Witcoff, Ltd.

(57) ABSTRACT

A computing device, such as a mapping application server, may track data associated with a plurality of user devices, such as an Internet Protocol version. A system, such as an IMS system, may use may use the data associated with the plurality of user devices to process messages. When messages between devices are received, the computing device may provide information regarding at least one protocol associated with a communication. The computing device may respond to queries from various network elements. The responses may provide data that may be used to identify a protocol version, such as a Name Authority Pointer (NAPTR). Any necessary protocol interworking may be provided by the system.

20 Claims, 11 Drawing Sheets

AUTOMATED IPV4-IPV6 SELECTION FOR VOICE NETWORK ELEMENTS

BACKGROUND

An Internet Protocol (IP) Multimedia Subsystem or IP Multimedia Core Network Subsystem (IMS) comprises a framework for delivering IP multimedia services, which may include a combination of voice, video, messaging, data, etc. within a session. A variety of different types of IMS devices (e.g. user equipment (UE), mobile phones, smartphones, personal digital assistants (PDAs), tablets, and computers) may be used for different types of network based communication and are provided with services by IMS Core network devices, such as a Call Session Control Function (CSCF) servers or proxies. Those devices may use different versions of the IP. There are currently two version of the IP in active use: Internet Protocol Version 4 (IPv4) and a newer version called Internet Protocol Version 6 (IPv6). IPv4 is the fourth revision of the Internet Protocol and is used to identify devices in a network via an addressing system. IPv4, which uses a 32-bit numeric addressing scheme, remains a widely deployed protocol used to connect devices to the Internet, but has a limit of just over 4 billion addresses. IPv6, which uses a 128-bit addressing scheme, is an evolutionary upgrade to IPv4. IPv6 may continue to be used with the older IPv4 for some time. Voice network elements within IMS networks, such as a Session Border Controller (SBC), a Media Gateway Control Function (MGCF), and IMS end points, need to know whether target user device is using either IPv4 or IPv6 signaling. Because the headers of IPv4 packets and IPv6 packets are significantly different, the two protocols are not interoperable. The selection of either IPv4 or IPv6 is needed in order to build and route Session Initiation Protocol (SIP) messages with the applicable IP version in a Session Description Protocol (SDP) offer. As such, it may be beneficial to determine the IP version of the packets within an IMS Core.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein are directed to session description mapping table or database that maps a user device identification information, such as telephone number (TN) from a registration, invite, or query message, to a resource record, such as a Name Authority Pointer (NAPTR), specific to either an IPv4 or IPv6 IMS Core. The session description mapping table may be an E.164 Number to Uniform Resource Identifier (URI) Mapping (ENUM) table or database (ENUM DB). Each IMS Core element may be assigned one or more first IP addresses to handle IPv4 messages, and one or more second IP addresses to handle IPv6 messages. By use of the ENUM table communicatively coupled to the IMS Core, the system may avoid unnecessary queries to a Domain Name System (DNS) system, which may accelerate the handling calls between devices with incompatible IP versions.

The ENUM table may be automatically maintained using standard IMS capabilities, including any SIP messaging standards. A network element may independently register computing device information with the ENUM table. When processing an originating call, a TN may be used to determine and retrieve the NAPTR servicing corresponding to that TN from the ENUM table. The IPI AS may be provisioned or configured with the mapping of NAPTR values to IPv4 or IPv6 protocol version for that user's IMS Core. If the IP versions respectively associated with the originating computing device and terminating computing device are different, then the IPI AS may return a message that indicates an IP version of the destination computing device or indicating that the IP versions may not be compatible.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
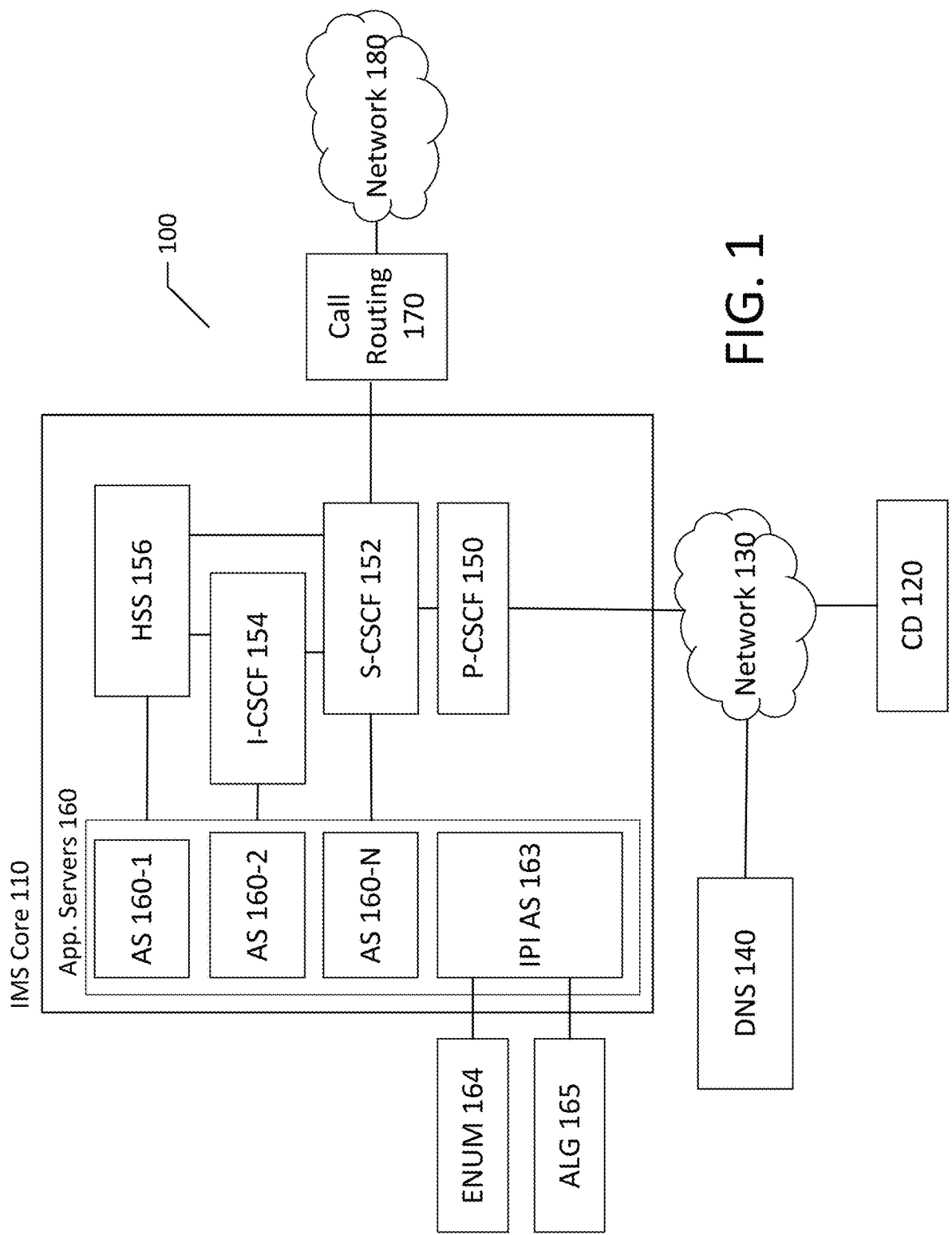
FIG. 1 shows an example system architecture diagram.

The accompanying drawings, which form a part hereof, show examples of the disclosure. It is to be understood that the examples shown in the drawings and/or discussed herein are non-exclusive and that there are other examples of how the disclosure may be practiced.

It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

As described below, a session description mapping table or database may be an E.164 Number to Uniform Resource Identifier (URI) Mapping (ENUM) table or database (ENUM DB) may be used for responding to messages for user equipment that is originating a call attempt or for responding to messages for terminating calls to subscriber user equipment. The ENUM table may be automatically maintained using standard IMS capabilities, including any SIP messaging standards. A network element, such as a Serving-CSCF (S-CSCF) server, may independently register computing device information with the ENUM table. The S-CSCF may send each computing device registration message as a third party registration message to an Internet Protocol Interworking application server (IPI AS) that may store or access the ENUM table. The third party registration message from the S-CSCF may be initiated based on S-CSCF control logic, such as an initial filter criteria (iFC). The iFC may be implemented as logic processing using the telephone number and contact header IP address of a registration message, the IPI AS updates the ENUM DB to reflect the IMS Core NAPTR and computing device's IP version, if necessary.

When processing an originating call, an S-CSCF may be directed via an iFC to the Internet Protocol Interworking AS, which uses the TN to determine and retrieve the NAPTR servicing corresponding to that TN from the ENUM table. The IPI AS may be provisioned or configured with the mapping of NAPTR values to IPv4 or IPv6 protocol version for that user's IMS Core. If the IP versions respectively associated with the originating computing device and terminating computing device are different, then the IPI AS may return, to a querying network element, a message that indicates to IP version of the destination computing device or indicating that the IP versions are not compatible. Such a message may be a SIP 488 Not Acceptable Here message indicating that additional IP interworking processing, such as IP version translation, is necessary. The querying network element or at least a portion of the IMS host system elements may then provide IP version interworking of both signaling and media data, and the call may be allowed to proceed.

If either the terminating/receiving TN is off-network or the originating and terminating/receiving computing device s are determined to share the same IP version, the IPI AS returns a message indicating the IP versions are compatible. Such a message may be an SIP 501 Not Implemented message indicating that no additional IP interworking is necessary, to allow the call message to proceed to the computing device.

FIG. 1 shows one example of a network architecture and data processing device that may be used to implement one or more aspects described herein. As shown in FIG. 1, the home network system 100, includes IMS Core 110 which is coupled to computing device 120 over an access network 130. The computing device 120 performs a discovery process using the DNS server 140. The registered computing device 120 may comprise any device, such as, for example, computing devices, wireless devices, mobile devices, handsets, tablets, laptops, internet of things (IoT) devices, hotspots, cellular repeaters, and/or, more generally, user equipment (e.g., UE). The access network 130 may comprise one or more devices, e.g., wireless device, base station, eNB, gNB, computing device, etc.

Various network nodes 110, 120, 140, 170, and 180 may be interconnected via a wide area network (WAN), such as the Internet. Other networks may also or alternatively be used, including private intranets, corporate networks, LANs, wireless networks, personal networks (PAN), and the like. The network 130 is for operational purposes and may be replaced with fewer or additional computer networks. A local area network (LAN) may have one or more of any known LAN topology and may use one or more of a variety of different protocols, such as Ethernet. The devices 110, 120, 140, 170, and 180 and other devices therein may be connected to one or more of the networks via twisted pair wires, coaxial cable, fiber optics, radio waves or other communication media.

A network may comprise systems in which remote storage devices are coupled together via one or more communication paths. A network may also comprise stand-alone devices that may be coupled, from time to time, to such systems that have storage capability.

The computing device 120 may identify, through the use of domain names systems or servers (DNS) 140, a particular Call Session Control Function (CSCF) server of an IMS Core 110. The IMS Core 110 may provide services with a plurality of other standards. For example, 3GPP, an example wireless industry base standard, and PacketCable 2.0, an example Multiple System Operator (MSO) base standard, may be used with the IMS Core 110 described herein. A plurality of IMS Cores 110 may be provided in a system, and each IMS Core 110 may be provisioned to different areas or may be provisioned to handle different types of communications. That is, certain IMS Cores 110 may be provisioned to handle IPv4 communications and other IMS Cores 110 may be provisioned to handle IPv6 communications.

The Call Session Control Function may comprise at least three different elements: P(Proxy) 150, S(Session) 152 and I(Interrogating) 154. Each of the P-CSCF, S-CSCF, and I-CSCF functions may have defined roles, defined interfaces, and defined functions. After an end-user initiates a call, a number may be dialed and those digits may be injected into a session initiation protocol (SIP) invite message. That same invite may be passed across different Call Session Control Function elements. The different Call Session Control Function proxies serve different, specific functions, but may each be involved in the call path for both call setup and call tear down. If any single proxy were to fail, then the call may fail.

The computing device 120 may comprise an embedded digital voice adapter (EDVA), which may be user premise equipment EDVA, which may implement the PacketCable 2.0 protocol. The EDVA may comprise a voice line card that is a part of a Data Over Cable Service Interface Specification (DOCSIS) cable modem, which may be part of a gateway situated at the user premise. An access network 130, such as a hybrid-fiber or coaxial access network, may provide network connections between the computing device or EDVA 120 and the IMS Core 110. The access network 130 may comprise a radio access network as part of a mobile telecommunication system, such as local Ethernet, powerline, Evolved Universal Terrestrial Radio Access (E-UTRA), Long-Term Evolution (LTE), LTE-Advanced, 5G, Global System for Mobile Communications (GSM), Wi-Fi or other IEEE 802.11 standard, or passive optical distribution network (PON), or any other network for wireless communications. The local access network, which may include a hybrid fiber-coaxial (HFC) network and a cable modem termination system (CMTS), may be part of the physical data plane and control plane interface.

The Proxy-CSCF (P-CSCF) 150 may be communicatively coupled the access network 130 and may provide a variety of different network functions. For example, P-CSCF 150 may perform network address translation (NAT) (e.g. between different IP spaces) or firewall functions. The P-CSCF may be the initial entry point into a service-providers trusted access network, and may be located either in a visited IMS network being accessed from the access network (in full IMS networks) or in the home network (if the visited network is not yet IMS compliant). The P-CSCF 150 may handle user authentication, validate the user as authorized, and handle exchanges of security keys as part of the registration process. Some networks may use a Session Border Controller (SBC) for these functions. The P-CSCF 150 may function as a specialized SBC for the user-network interface which protects the network and the IMS terminal. The computing device 120 may discover its P-CSCF via a DNS 140 lookup. The lookup procedure may use Dynamic Host Configuration Protocol (DHCP), or may be configured (e.g. during initial provisioning or via a 3GPP IMS Management Object (MO)) or in the ISIM or assigned in the PDP Context (for General Packet Radio Service (GPRS)). The computing device 120 may send a query to a Dynamic Host Configuration Protocol (DHCP) server for retrieving the IP addresses and Fully Qualified Domain Name (FQDN) of the P-CSCF 150. The computing device 120 may use the P-CSCF FQDN, that it obtained during the DHCP procedures, in the DNS look up to get the IP address of the P-CSCF 150 associated with that FQDN.

One of a plurality of P-CSCFs 150 may be assigned to a computing device 120 before registration, and does not need to change for the duration of the registration. Each IMS Core 110 may include a plurality of P-CSCFs 150 or other network elements. The assignment may be based on geography. For example, a user in the western part of a region may register to a west region based P-CSCF.

The P-CSCF sits in the path of all signaling for the computing device 120, and may inspect every signal and message from and to the computing device 120. The P-CSCF 150 may provide subscriber authentication and may establish a security association with the IMS computing device 120. The P-CSCF 150 may be responsible for inspecting signals entering the IMS Core 110. For example, the P-CSCF 150 may inspect packets to ensure that signals from IMS terminals maintain normal signaling routes. The P-CSCF 150 may include a Policy Decision Function (PDF), which authorizes media plane resources e.g., quality of service (QoS) over the media plane. The PDF may be used for policy control, bandwidth management, etc. The Policy Decision Function may also be a separate function. The P-CSCF 150 may also generate charging records for use in user billing.

A Serving-CSCF (S-CSCF) 152 may be the central node of the signaling plane, may be a SIP server, and may perform session control. The S-CSCF 152 may make some call-routing decisions and may invoke application servers. The S-CSCF 152 may be located in the home network. The S-CSCF 152 may use Diameter interfaces to the HSS 156 to download user profiles and upload user-to-S-CSCF associations. Subscriber profile information may be loaded from the HSS 156. The S-CSCF 152 may handle SIP registrations, which allows it to bind the user location (e.g., the IP address of the terminal) and the SIP Address of Record (AOR). The S-CSCF 152 may be connected to a number of call routing and interconnection modules 170, which may in turn be connected to an outside network 180.

The S-CSCF 152 may sit on the path of signaling of the locally registered computing devices 120, and may inspect message sent to and from the computing devices 120. The S-CSCF 152 may decide to which application server(s) 160 a SIP message may be forwarded, in order to provide application services. The S-CSCF 152 may provide routing services, typically using E.164 Number to URI Mapping (ENUM) lookups. The S-CSCF 152 may enforce the policy of the network operator. There may be multiple S-CSCFs 152 in the network for load distribution and high availability reasons. The HSS 156 may assign the S-CSCF 152 to a computing device 120, and the HSS 156 may be queried by the Interrogating-CSCF (I-CSCF) 154. The S-CSCF 152 may also communicate with other call routing and interconnection elements 170, such as Session Border Controllers, to connect to outside networks 180, and may provide communication between computing devices 120 in the home network 100 and computing devices 120 or other devices in outside networks 180.

An Interrogating-CSCF (I-CSCF) 154 may perform other SIP functions for the IMS Core 110 and may be located at the edge of an administrative domain. The I-CSCF 154 IP address may be published in the DNS 140 of the domain (using Name Authority Pointer (NAPTR) and service record (SRV) type of DNS records), so that remote servers can find it, and may use it as a forwarding point (e.g., for registering) for SIP packets to this domain. The I-CSCF 154 may query the HSS 156 to retrieve the address of the S-CSCF 152 and may assign the S-CSCF address to a computing device 120 performing SIP registration. The I-CSCF 154 may also forward SIP requests or responses to the S-CSCF 152.

The HSS 156 may be a master user database that supports the IMS network entities that actually handle calls. HSS 156 may contain the IMS subscription-related information (subscriber profiles), may perform authentication and authorization of the users, and may provide information about the subscriber's location and other IP information.

The I-CSCF 154 may be used to hide the internal network from outside networks and devices external to the IMS Core 110 (encrypting parts of the SIP message), as a Topology Hiding Inter-network Gateway (THIG). That function may also be implemented as part of the Interconnection Border Control Function (IBCF). The IBCF may be used as gateway to external networks and may provide NAT and firewall functions (e.g. pinholing). The IBCF may be a Session Border Controller specialized for the network-to-network interface (NNI).

The IMS Core 110 may also include a plurality of application servers 160. A Telephony Application Server (TAS) may be used by residential IMS users for feature processing, such as call holding, call dialing, or any other feature processing for residential users. A Business Application Server (BAS) may be used to provide services for business subscribers. For example, a law firm may have different branches and a home network 100 subscriber that may be part of one business group, which may be served by the BAS. Any features, such call forwarding, extension dialing, or any other business features may be served by the Business Application Server. A Communication Application Server (CAS) may be used for other application services, such as TV call notification. For example, a home network 100 subscriber who has WiFi and TV services may get a notification, generated by the CAS, about an identity of a caller on a TV.

The servers 140, 150, 152, 154, 156, and 160 may provide overall access, control and administration of databases and control software for performing one or more operations described herein. The servers may be connected to other intermediary servers (not shown) through which users interact with and obtain data as requested. Alternatively, one or more of the servers may act as a web server and be directly connected to the Internet. The servers 140, 150, 152, 154, 156, and 160 may be connected to computing devices 120 via the network 130 (e.g., the Internet), via direct or indirect connection, or via some other network. Users may interact with the servers using remote computing devices, mobile devices or other user equipment 120.

Servers and applications may be combined on the same physical machines, and retain separate virtual or logical addresses, or may reside on separate physical machines. FIG. 1 shows just one example of a network architecture that may be used, and the specific network architecture and data processing devices used may vary, and may be secondary to the functionality that the described devices and/or other devices provide, as further described herein. For example, services provided by a Business Application Server and other application servers may be combined.

As computing devices 120 register with a particular P-CSCF, a traffic engineer may track, through Key Performance Indicators (KPIs) or reports, a number of computing devices 120 that may be registering to a particular P-CSCF instance based on the entries that may be in DNS. As millions of end point computing devices 120 may be registered with a particular P-CSCF at any point in time, the volumes generally change gradually. If a P-CSCF is found to be nearing or in an overloaded state, the traffic engineer may update the DNS to point at least a portion of a specific geographic region to a different P-CSCF. Computing devices 120 may then start to register to the different P-CSCF. As such, a portion of the user base of a first P-CSCF may be directed to a different or second P-CSCF to avoid an overload condition in the first P-CSCF. The manipulation of DNS entries may allow user equipment or endpoints to be directed to and registered with a different P-CSCF.

An Internet Protocol Interworking application server (IPI AS) 163 may provide E.164 Number to URI Mapping (ENUM) of a telephone number (TN) in E.164 Number format to information indicating a session description protocol and other session description information, such as a Name Authority Pointer (NAPTR), specific to either an IPv4 or IPv6 IMS Core. The IPI AS 163 may be used for both originating and terminating call attempts from different IMS Cores 110 that may be assigned one or more first IP addresses to handle IPv4 calls, and one or more second IP addresses to handle IPv6 calls.

IPI AS 163 may be coupled to or may incorporate an ENUM table or database (ENUM DB) 164 that associates the TNs to NAPTRs. The ENUM DB 164 may be automatically maintained using standard IMS capabilities. For example, the S-CSCF 152 may send computing device 120 registration messages as a third party registration message to an Internet Protocol Interworking application server 163 (IPI AS) as directed by an initial filter criteria (iFC), for initial request messages like invite and registration messages. Based on the iFC, the initial request may be forwarded to the IPI AS 163. Using the telephone number and contact header IP address of a registration message associated with computing device 120, the IPI AS 163 may update the ENUM DB 164 to reflect the IMS Core NAPTR and computing device's 120 IP version, if necessary.

When processing an originating call from the computing device 120, an S-CSCF 152 is directed by control logic, such as an iFC, to query the IPI AS 163 with the TN of the computing device 120. The IPI AS 163 may receive a message including the TN of the computing device 120, and may use the TN to determine and may retrieve the NAPTR servicing corresponding to that TN from the ENUM DB 164. The IPI AS 163 may be configured with the mapping of NAPTR values to in IP version associated with computing device 120. The IPI AS 163 may access that mapping to determine that one of an IPv4 or IPv6 protocol version may be associated with the computing device 120 message. If the IP versions respectively associated with the originating computing device and terminating computing device are different, then the IPI AS 163 may return a message indicating that the IP versions may not be compatible, such as a SIP 488 Not Acceptable Here message, as discussed below with regards to S405 of FIG. 4, indicating that additional IP interworking processing may be necessary, to the IMS Core 110. The IMS Core elements may then provide IP version interworking of both signaling and media data, and the call may be allowed to proceed. If the IP versions respectively associated with the originating computing device 120 and terminating computing device are the same, then the IPI AS 163 may return a message indicating that the IP versions are compatible, such as a SIP 501 Not Implemented message discussed below with regards to S505 of FIG. 5, and indicating that additional IP interworking processing is not necessary to the IMS Core 110. The IMS Core elements may then allow the call messaging to proceed to the computing device 120 without any changes necessary to the invite.

Alternatively, a different ENUM DB 164 may map a TN to a fully qualified domain name (FQDN). By mapping the TN to a FQDN, a querying network element, such as a particular computing device 120, S-CSCF 152, or SBC 172 may resolve the target IP address and IP version via a DNS query. By using this DNS query, the IPI AS 163 may be queried only when necessary. Control logic may implement an iFC to scan the SDP for IPv6 involvement, and only conditionally invoke the IPI AS 163. For example, the control logic/iFC may be used by the S-CSCF 152 to invoke the IPI AS 163 only when there is an indication that the request is associated with IPv4.

An Application Level Gateway (ALG) 165 may be communicatively coupled to the IPI AS 163 to provide Session Description Protocol (SDP) translation for Session Initiation Protocol (SIP) messages with the different IP versions. The translation functions of the ALG 165 may also be integrated into the IPI AS 163. A computing device 120 may also access the IMS Core 110 through the ALG 165. The ALG 165 may serve as a firewall proxy between a computing device 120 and the IMS Core 110, may remove addressing contained within SIP signaling if required, or may alter addressing to support network layer address translation (NAT). Additionally, the ALG 165 may monitor SIP signaling in order to detect malicious attacks. The ALG may be a functional entity of an IBCF (Interconnection Border Control Function).

The IMS Core 110 may include a Media Resource Function (MRF), not shown, which may be a media server that provides media related functions such as media manipulation (e.g. voice stream mixing) and playing of tones and announcements. Each MRF may be further divided into a media resource function controller (MRFC) and a media resource function processor (MRFP). The MRFC may be a signaling plane node that interprets information coming from an application server and S-CSCF to control the MRFP. The MRFP may be a media plane node used to mix, source or process media streams. The MRFP can also manage access rights to shared resources. The Media Resource Broker (MRB) may be a functional entity that may be responsible for both collection of appropriate published MRF information and supplying of appropriate MRF information to consuming entities such as the AS. The MRB may be used in two modes, a Query mode and an In-Line mode. In the Query mode, an application server may query the MRB for media and may set up the call using the response of MRB, and in the In-Line Mode, an AS may send a SIP INVITE to the MRB and the MRB may set up the call.

The IMS Core 110 may include a Call Charging Function (CCF), which may be a server that creates and manages a billing record that may be created as calls are made. The billing record may include information such as a calling party, the called party, the duration of the call, and other information associated with the call needed for billing records. That information may be fed into the CCF by the IMS network elements. The billing records may be concealed from other IMS network elements.

The call routing and interconnection modules 170, which may in turn be connected to an outside network 180, may include a variety of session border controllers (SBCs), which serve as edge devices that interface the host network with outside networks. The SBCs may help protect the network from another service provider, providing a firewall and network address translation (NAT) functions as needed, and hiding the network topology so that the entire networks IP address space does not have to be provided to another service provider. Instead, calls from an outside network to the home network may be sent to the home network SBC IP addresses. A Communications Assistance for Law Enforcement Act (CALEA) SBC may be an interface for legal compliance with law enforcement agencies. Other SBCs for public internet access may be used for over the top (OTT) clients that provide the ability to make and receive calls with your home computing device number using a smartphone application. A user specific network-to-network interface (NNI) may be provided for syndicating a home networks voice service to third party networks to which the home network needs to connect. The NNI may act as a SBC to talk with a specific connected outside network and interface to their access network. A peering SBC may provide SIP peering and interconnection to least cost routing carriers, including 911 services. A least cost routing carrier may provide call-terminating services for long distance calls not serviced by direct connections. Priority registration may be provided to preferred or required users, such as for compliance with legal or contractual requirements.

The call routing and interconnection modules 170 may also include a SIP Route Proxy (SRP) that performs normalization and may perform some routing lookup functions and a Border Gateway Control Function (BGCF) that may make call routing decisions. For example, if a call is destined to an outside network user, then a BGCF may send the call to the outside network specific session border controller (SBC). A Media Gateway Control Function (MGCF) and Signaling Transfer Point (STP) may provide IP interworking functions. A media gateway (MGW) may be provided as a translation device or service that converts media streams between disparate telecommunications technologies such as plain old telephone service (POTS), SS700, Next Generation Networks (2G, 2.5G, 3G, 4G, and 5G radio access networks), or private branch exchange (PBX) systems. Media gateways may enable multimedia communications across packet networks using transport protocols such as Asynchronous Transfer Mode (ATM) and Internet Protocol (IP). The Media Gateway may provide time-division multiplexing (TDM) to IP interworking for carrier networks that cannot be reached via an IP interconnect. Regulatory requirements or network requirements may require interconnects to outside voice service providers through legacy technology. The Media Gateway may provide access to and interconnection with the public switched telephone network (PSTN) or a POTS.

Figure 2:
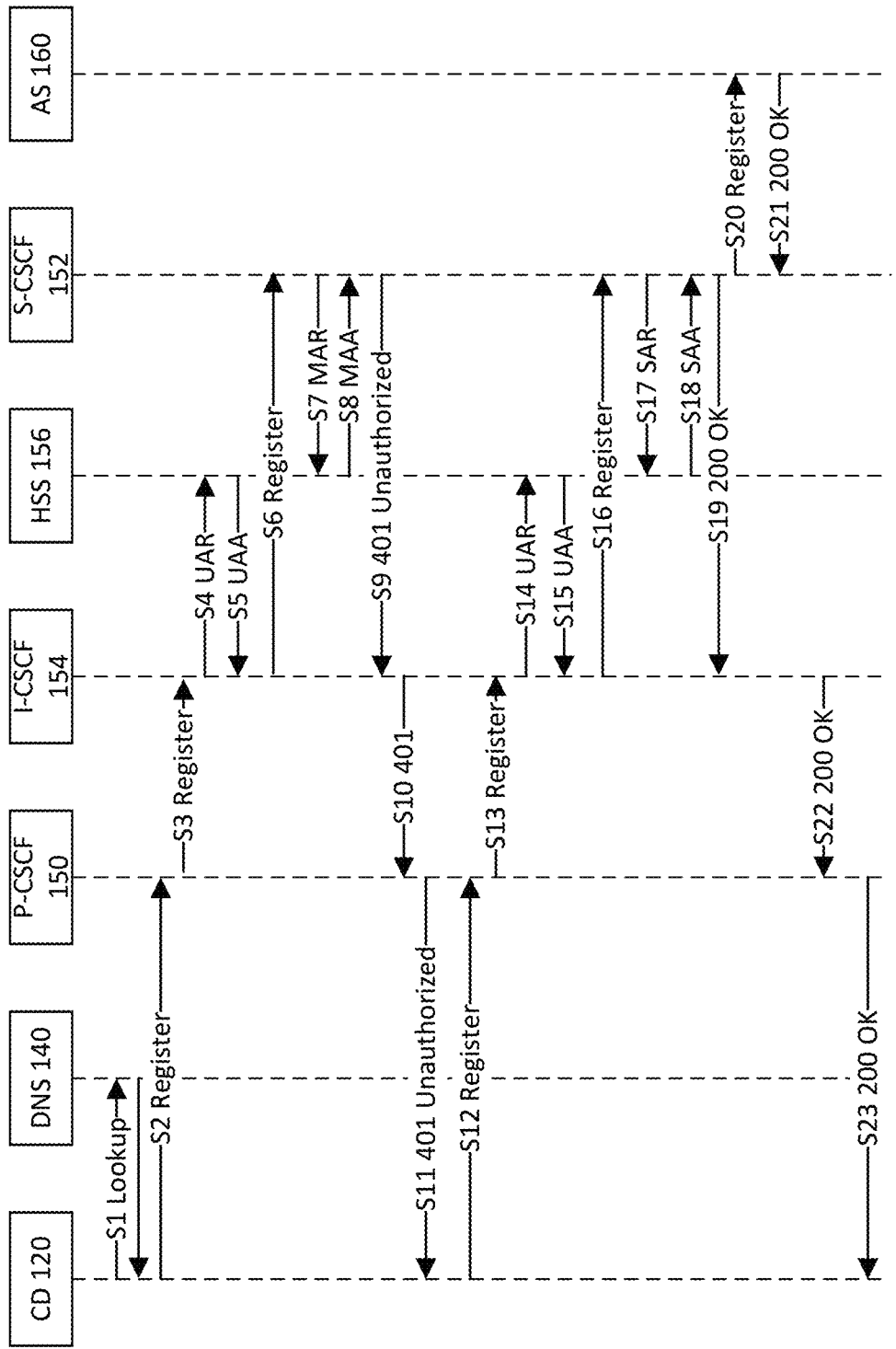
FIG. 2 shows an example chart showing message flows for an example method for IMS Registration process.

When a user device establishes a network connection, the device may register with the network element responsible for transmitting message signals to a target user device or outside networks. The additional processing may include a standard IMS discovery and registration process. In an example IMS Registration process, as shown in FIG. 2, the computing device 120 may establish IP connectivity, the computing device 120 may send a query to the Dynamic Host Configuration Protocol (DHCP) server for retrieving the computing device's 120 IP address. The DHCP response may also include a Fully Qualified Domain Name (FQDN) of the P-CSCF 150. In step S1, the computing device 120 may perform a series of DNS queries, including performing: 1) NAPTR lookup, 2) SRV lookup and 3) A/AAAA lookup specifying IP address of a given host for IPv4 and IPv6, respectively. In response to the DNS query, the IP address of the P-CSCF 150 may be returned. This may be known as the DHCP-DNS procedure for P-CSCF discovery. However, in some cases, it may be possible that the FQDN of the P-CSCF 150 may be pre-configured in the computing device 120. A computing device 120 with such a pre-configuration may directly query the DNS server and may retrieve the IP address of the P-CSCF.

In step S2, the computing device 120 may send a SIP REGISTER request to the P-CSCF 150 to register the computing device 120 in the IMS Core network 110. The computing device 120 or EDVA may send a SIP INVITE request to the P-CSCF 150 to which the computing device 120 may be previously registered. The P-CSCF 150, in step S3, may send a registration request to the I-CSCF 154. This may be known as the I-CSCF discovery process. The I-CSCF 154 may send a User-Authorization-Request (UAR), in step S4, to the HSS 156 and may receive, in step S50, a User-Authorization-Answer (UAA) back from the HSS. The I-CSCF 154, in step S60, then may send the registration request to the S-CSCF 152. The S-CSCF may send, in step S700, a Media-Authorization-Request (MAR) to the HSS 166 and may receive, in step S8, a Media-Authorization-Answer (MAA) back from the HSS. The S-CSCF may return, at step S9, the 401 unauthorized message to the I-CSCF, which may forward, at step S10, the SIP 401 unauthorized message indicating that user authentication may be required to the P-CSCF, which may forward, at step S11, the 401 unauthorized message to the computing device 120.

At step S12, the computing device 120 may send a registration message to the P-CSCF 150. The P-CSCF sends a registration request to an I-CSCF 154. The I-CSCF 154 may send, at step S13, a User-Authorization-Request (UAR) to the HSS 156 over a diameter link and receives a User-Authorization-Answer (UAA) back from the HSS 156. The I-CSCF 154 then sends, at step S16, registration request to the S-CSCF 152. The S-CSCF 152 may send, at step S17, a Server-Assignment-Request (SAR) to the HSS 156 and may receive a Server-Assignment-Answer (SAA) back from the HSS 156. The S-CSCF may return, at step S19, the SIP 200 OK message to the I-CSCF 154.

At step S20, the S-CSCF 152 may send a registration request to an application server (AS) 160, such as a telephony app server (TAS), and may receive the SIP 200 OK message from the AS 160 in step S21. The I-CSCF 154 may send, at step S22, a SIP 200 OK message to the P-CSCF 150, which may forward, at step S23, the SIP 200 OK message to the computing device 120.

Figure 3:
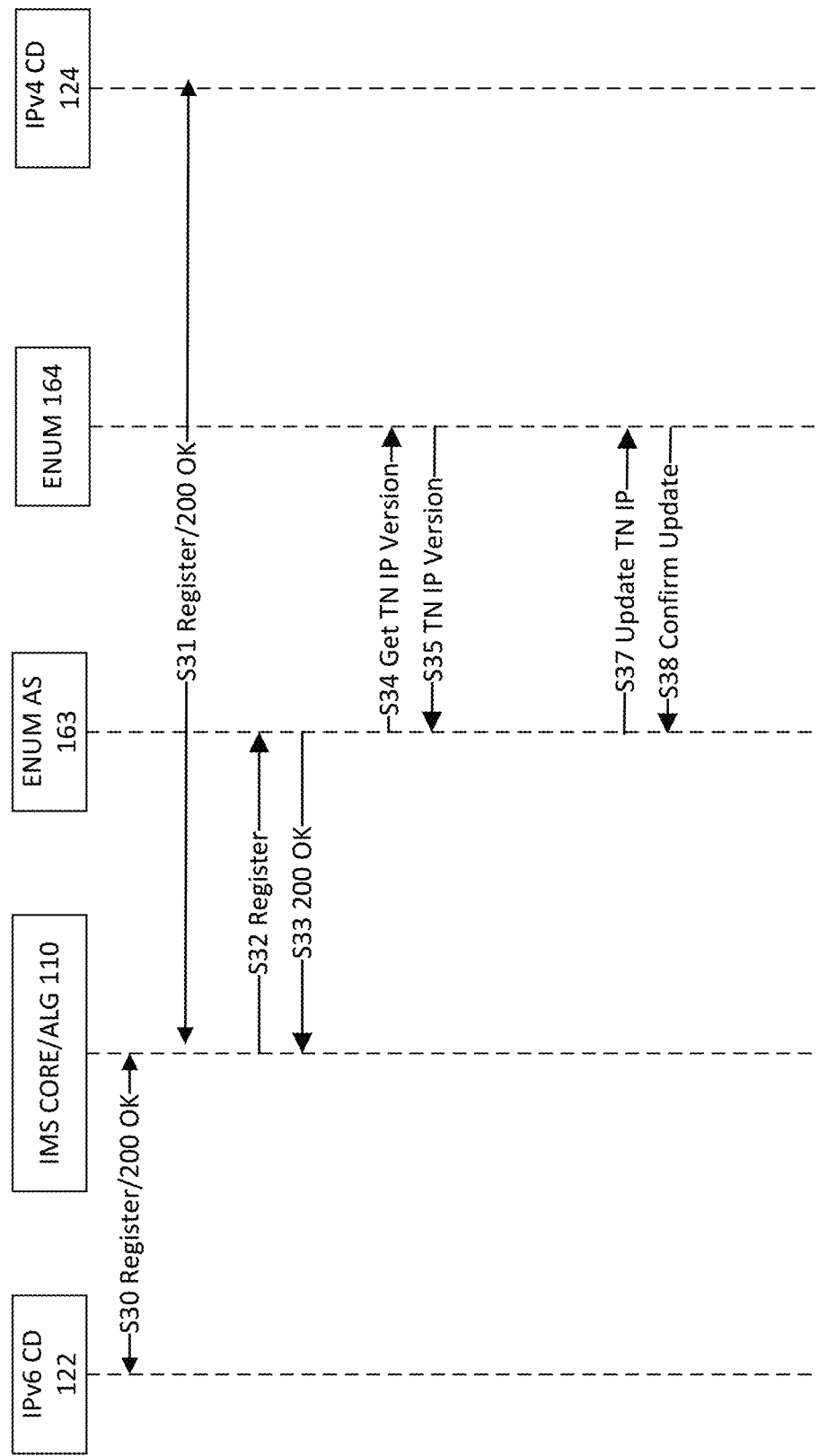
FIG. 3 shows an example chart showing message flows for an example method for computing device registration with the ENUM.

In FIG. 3, when processing an originating call from an IPv6 computing device 122 in step S30 or an IPv4 computing device 124 in step S31, a standard IMS registration may be performed, e.g. by following S1-23 of FIG. 2. The registration process may end with a 200 OK message being returned to the computing device 120. The IMS Core 110 may perform a third party registration process so that the ENUM table may be automatically maintained with up to date computing device information using IMS capabilities. For example, an S-SCCF 152 may be directed by an iFC to perform a third party registration with an IPI AS 163. The third party registration message may be transmitted to IPI AS 163, in step S32, which may be acknowledged with a message such as a SIP 200 OK message, as shown in step S33.

In step S34, the IPI AS 163 may query the ENUM DB 164 with the TN, from the registration message received in S32. The ENUM DB 164 may return the NAPTR servicing the TN in the query. The IPI AS 163 may be configured with the mapping of NAPTR values to IPv4 or IPv6 protocol version for the particular user's IMS Core 110.

Using the telephone number and contact header IP address of the register message from S32, the IPI AS 163 may update the ENUM DB 164 to reflect the IMS Core NAPTR and computing device's 120 IP version in step S37, if necessary. For example, the computing device 120 may receive software updates or network configuration updates that migrate the device from IPv4 to IPv6. If the computing device 120 is being migrated to IPv6, the IPI AS 163 may retrieve the information currently stored in the ENUM DB 164, and may update the information stored in the ENUM DB 164 for the user if necessary. On the other hand, if a device software or hardware bug is discovered, it may be necessary to roll back the computing device 120 registration from IPv6 to IPv4, so the IPI AS 163 may update the status, in step S37, to be either IPv6 to IPv4, and that update may be confirmed in S38. Alternatively, the device may be configured to connect to networks with both IPv6 to IPv4, and the data stored by the IPI AS 163 may need to be updated based on the current registration the computing device 120.

Figure 4:
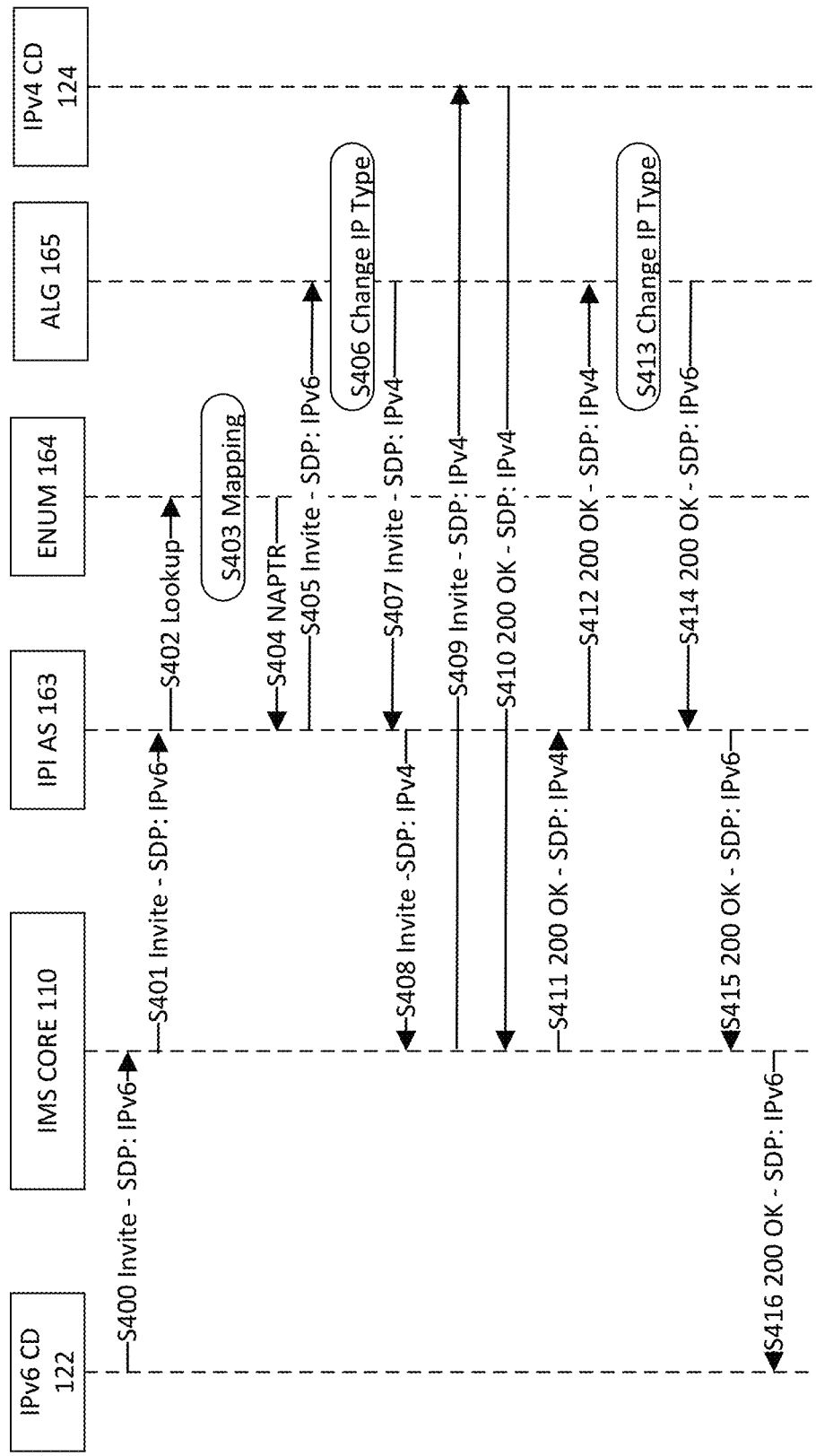
FIG. 4 shows an example chart showing message flows for an example method for IPv6 device interworking processing with an IPv4 device.

When an originating IPv6 computing device 122 subscriber calls a destination subscriber IPv4 computing device 124, as shown in FIG. 4, the originating IPv6 computing device 122 subscriber may transmit an invite message, in step S400, towards the destination subscriber IPv4 computing device 124 via the IMS Core 110 including an indication that the Session Description Protocol (SDP) may be IPv6. The S-CSCF 152 of the IMS Core 110 may transmit an invite, in step S401, including the indication that the SDP is IPv6, to the IPI AS 163. The IPI AS 163 may perform a lookup, in step S402, of the destination subscriber in the ENUM DB 164 using the destination subscriber TN from the invite received in S401. The ENUM DB 164 may map, in step S403, the destination subscriber TN to session description information, such as an IMS Core/ALG Name Authority Pointer (NAPTR), and returns the session description information in a response to the IPI AS 163 in step S404.

The IPI AS 163 may compare the NAPTR returned in step S404, from the ENUM DB 164, with a set of preconfigured NAPTR values to determine the IP version of the destination subscriber, which in this case may be IPv4. If the determined IP version of the destination subscriber 124 (e.g. IPv4) does not match the IP version of the originating subscriber 122 (e.g. IPv6), the IPI AS 163 may return a message to the querying device indicating the same, such as a SIP 488 Not Acceptable Here message to the IMS Core 110. When the determined IP version of the destination subscriber 124 (e.g. IPv4) does not match the IP version of the originating subscriber 122 (e.g. IPv6), the IPI AS 163 may transmit the invite message to the ALG 165 for translation in S405. The translation may include IP version interworking of both signaling and media to change the IP type of the invite message received in S406. The ALG 165 may provide, in in S406, SDP translation for the SIP invite message to the IP version of the destination subscriber. The ALG 165 may transmit, in S407, the translated SIP invite message to the IPI AS 163. The IPI AS 163 may transmit, in S408, the translated SIP invite message to the IMS Core 110.

The IMS Core 110 may, in step S409, transmit the message that has been translated to the IP version of the destination subscriber 124 (e.g. IPv4). That is, when the message has undergone IP version translation determined to be necessary by the IPI AS 163, the translated SIP Invite message received in S408, based on the original invite in S400, may be forwarded to the destination subscriber 124 in S409. The Invite message of S409 may be transmitted through one or more intermediate network elements. The Invite message of S409 may indicate that it is from the originating subscriber (e.g. a IPv6 subscriber 122) and directed to the destination subscriber (e.g. a IPv4 subscriber 124).

In response, the destination subscriber 124 may respond with a SIP 200 OK message in S410. The SIP 200 OK message may need to be transmitted back to the originating subscriber 122 to allow the call to proceed. In S411, the SIP 200 OK message may be transmitted to the IPI AS 163. In S412, the SIP 200 OK message may be transmitted to the ALG 165, for SDP translation to the IP version of the originating subscriber 122 (e.g. IPv6) in S413. In S414, the translated SIP 200 OK message may be transmitted back to the IPI AS 163. The translated SIP 200 OK message may be transmitted to the IMS Core 110, in S415, and to the originating subscriber 122 in S416.

Figure 5:
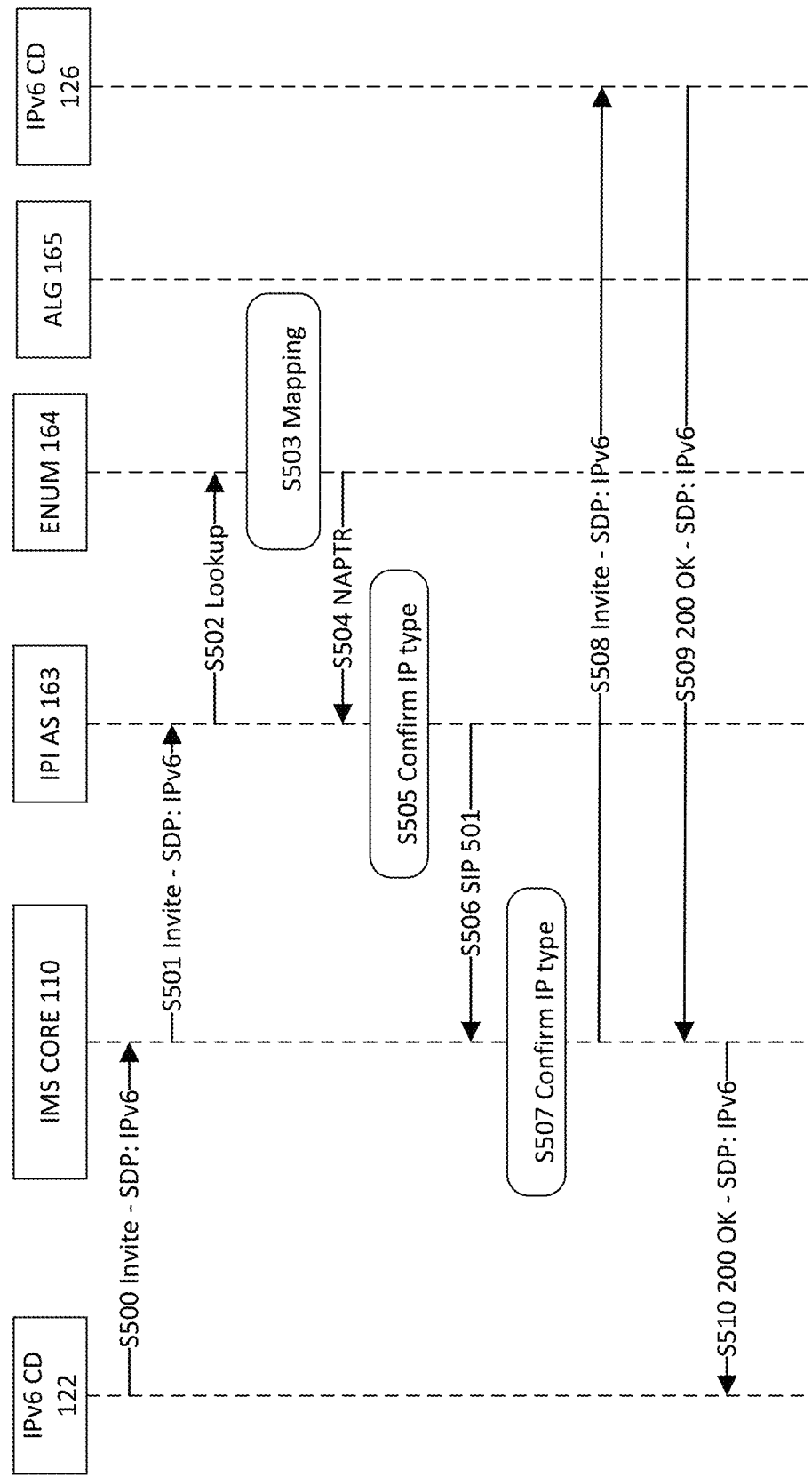
FIG. 5 shows an example chart showing message flows for an example method for IPv6 device interworking processing with an IPv6 device.

When an originating IPv6 computing device 122 subscriber may call a destination subscriber IPv6 computing device 126, as shown in FIG. 5, the originating IPv6 computing device 122 subscriber may transmit an invite message, in step S500, towards the destination subscriber IPv6 computing device 126 via the IMS Core 110 including an indication that the Session Description Protocol (SDP) is IPv6. The S-CSCF 152 of the IMS Core 110 may transmit the invite, in step S501, including the indication that the SDP is IPv6, to the IPI AS 163. The IPI AS 163 may perform a lookup, in step S502, of the destination subscriber in the ENUM DB 164 using the destination subscriber TN from the invite received in S501. The ENUM DB 164 may map, in step S503, the destination subscriber TN to an IMS Core/ALG Name Authority Pointer (NAPTR), and may return the NAPTR in a response to the IPI AS 163 in step S504.

The IPI AS 163 may compare the NAPTR returned in step S504, from the ENUM DB 164, with a set of preconfigured NAPTR values to determine the IP version of the destination subscriber, which in this case may be IPv4. The IPI AS 163 may be provisioned or configured with the mapping of NAPTR values to IPv4 or IPv6 protocol version for that user's IMS Core 110. As such, in S505, the IPI AS 163 may confirm that the IP version associated with the NAPTR value received in S504 matches the IP version associated with the Invite message received in S501. As the IP version of the invite message is confirmed, no interworking or translation by the ALG 165 may be necessary. When the determined IP version of the destination subscriber 126 (e.g. IPv6) matches the IP version of the originating subscriber 122 (e.g. IPv6), the IPI AS 163 may return a SIP 501 Not Implemented message to the IMS Core 110 in step S506.

The IMS Core 110 may, in step S507, determine that it is not necessary to provide IP version interworking of both signaling and media for matching IPv6 from the invite and the call proceeds. For example, when receiving the SIP 501 message from the IPI AS 163, the IMS Core 110 may determine that the SDP offer may be made in IPv6 in step S507, as it originated in step S500. The IMS Core 110 may transmit, in step S508, and SIP invite indicating that it is from the originating subscriber 122 (e.g. a IPv6 subscriber) to the destination subscriber 126 (e.g. a IPv6 subscriber) with an indication that the SDP is IPv6. As the destination subscriber 126 (e.g. a IPv6 subscriber) is compatible with the suggested SDP (e.g. IPv6) of the invite received in step S508, the destination subscriber 126 may respond to the IMS Core 110 with a 200 OK message in step S509. The IMS Core 110 may transmit a corresponding 200 OK message to the originating subscriber in step S510, and may begin all further processing and messaging for the call.

When the system receives a call from outside the host system to a computing device 122 associated with the IMS Core 110, a call invite message from the peer computing device 128 may be received by a querying device, such as an SBC 172 or a Media Gateway Control Function (MGCF). The invite message may include a SDP of either IPv6 or IPv4. Calls from outside the host system may also be received from other querying network elements, other than a SBC or MGCF, such as a Breakout Gateway Control Function (BGCF), an access gateway control function (AGCF), an Interconnection Border Control Function (IBCF), other public switched telephone network (PSTN) circuit switched (CS) gateway interface such as a signaling gateway (SGW) interfaces, or other non-edge querying devices.

Figure 6:
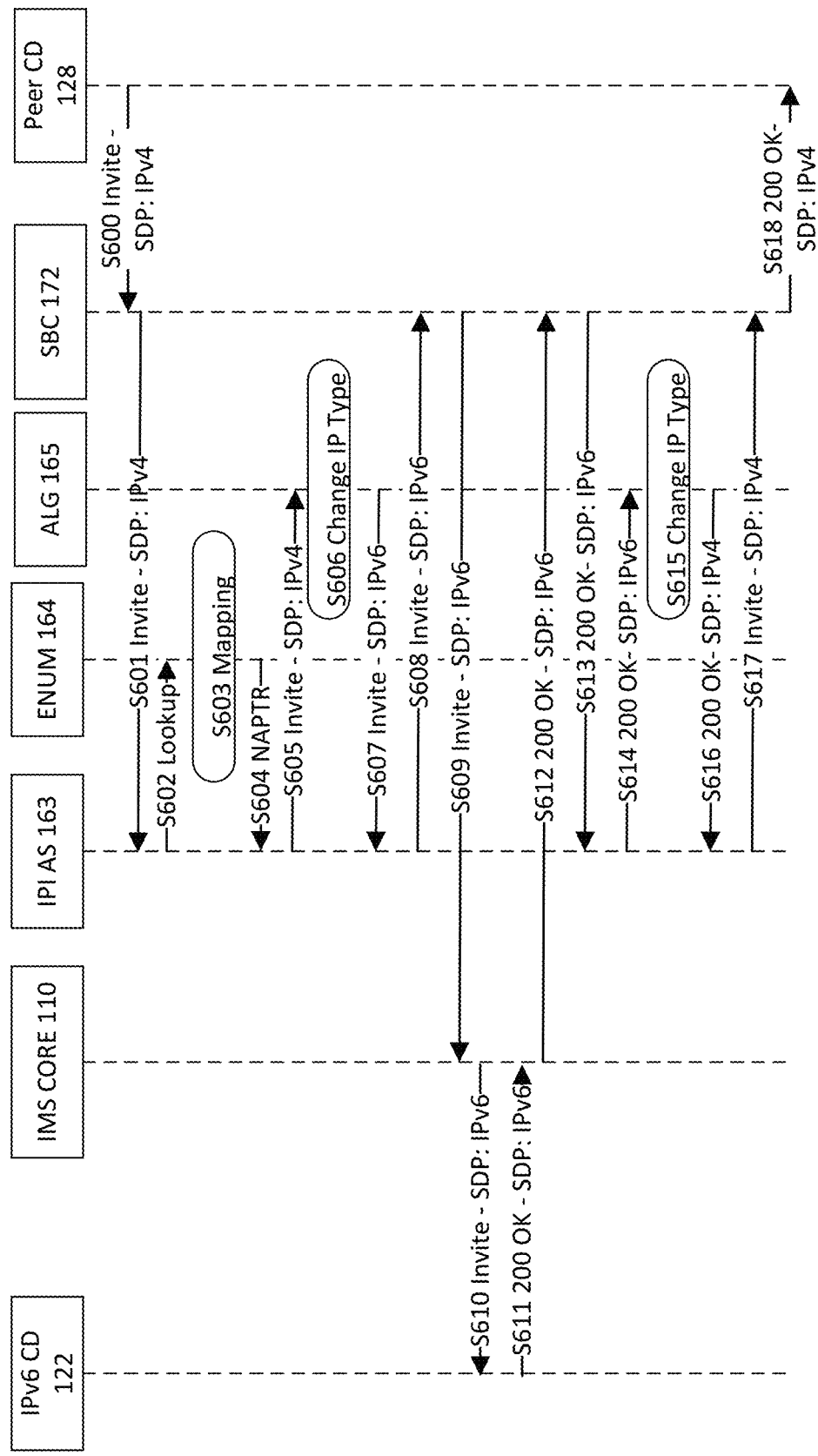
FIG. 6 shows an example chart showing message flows for an example method for IPv4 peer device interworking processing at an edge network element with an IPv6 device.

When processing a terminating call received from outside the network, as shown in FIG. 6, an invite message from an outside peer computing device 128 may transmitted to the SBC 172 or a MGCF. The SBC may be configured to directly query, in step S601, the IPI AS 163 with the TN (in e164 format) from the invite to retrieve the NAPTR servicing that TN. The IPI AS 163 performs a lookup, in step S602, of the destination subscriber in the ENUM DB 164 using the destination subscriber TN from the invite received in S601. The ENUM DB 164 may map, in step S603, the destination subscriber TN to an IMS Core 110 Name Authority Pointer (NAPTR), and returns the NAPTR in a response to the IPI AS 163 in step S604.

Based on the destination NAPTR transmitted to the IPI AS 163 in step S604, the SBC 172 or a MGCF may route the call to either an IPv4 or IPv6 IMS Core 110, as appropriate, with either an IPv4 or IPv6 SDF offer. If the invite message from the outside peer computing device 128 is directed to an IPv4 destination computing device, the invite may be transmitted via an IPv4 IMS Core without additional processing. When an originating peer invite is from an IPv6 subscriber calls a destination IPv6 subscriber, as shown in FIG. 5, the originating IPv6 subscriber may transmit an invite message to the destination subscriber through the IMS Core 110, without translation, including an indication that the SDP is IPv6.

When an IPv4 invite for Peer computing device 128 may be received from outside the IMS Core 110, the SBC 172 may initiate, by control logic or an iFC, a query to the IPI AS 163. This query, step S601, may be made directly by the SBC 172, or MGCF, or may be made by the S-CSCF 152 of the IMS Core 110. The IPI AS 163 may perform, in step S602, a lookup of the destination subscriber in the ENUM DB 164 using the destination subscriber TN. The ENUM DB 164 may map, in step S603, the destination subscriber TN to an IMS Core 110 Name Authority Pointer (NAPTR), and may return the NAPTR in a response to the IPI AS 163, in step S604.

When the destination NAPTR, corresponding to IPv6 computing device 122, is received by the IPI AS 163 in step S604, the IPI AS 163 may determine the need to build a compatible invite with the SDP of the destination computing device 122 (e.g. IPv6). As IPv4 and IPv6 have different header information and addressing schemes, the IPI AS 163, ALG 165, an SBC 172, or element of the IMS Core 110, such as the S-CSCF 152, may be utilized a translate between the protocols.

Interworking processes may build messages that allow hosts of both IP versions to communicate in one communication session. In step S605, the IPI AS 163 may transmit the IPv4 invite to the ALG 165 for translation in S605. The translation may include IP version interworking of both signaling and media to change the IP type of the invite message. The ALG 165 may provide, in in S606, SDP translation for the SIP invite message to the IP version of the destination subscriber. The ALG 165 may transmit, in S607, the translated SIP invite message to the IPI AS 163. The IPI AS 163 may transmit, in S608, the translated SIP invite message to the SBC 172.

The SBC 172 may, in step S609, transmit the message that has been translated to the IP version of the destination subscriber 122 (e.g. IPv6). For example, when the message has undergone IP version translation determined to be necessary by the IPI AS 163, the translated SIP Invite message received by the SBC 172 from the IPI AS 163 in S608, based on the original invite in S600, may be transmitted toward the destination subscriber 122 in S609. The IPv6 Invite message of S609 may be transmitted via the S-CSCF 152 of the IMS Core 110 associated with the destination subscriber 122, and transmitted to the destination subscriber 122 in S610. The Invite message of S610 may indicate that it is from the originating subscriber (e.g. IPv4 peer 122) and that it is directed to the destination subscriber (e.g. a IPv6 subscriber 122).

In response, the destination subscriber 124 may respond with a SIP 200 OK message in S611. The SIP 200 OK message may need to be transmitted back to the originating peer 128 to allow the call to proceed. In S612, the SIP 200 OK message may be transmitted to the SBC 172. In S613, the SIP 200 OK message may be transmitted to the IPI AS 163 for another round of translation back to IPv4 of the peer computing device 128. In S614, the SIP 200 OK message may be transmitted to the ALG 165, for SDP translation to the IP version of the originating subscriber 122 (e.g. IPv6) in S615. In S616, the translated SIP 200 OK message may be transmitted back to the IPI AS 163. The translated SIP 200 OK message may be transmitted to the SBC 172, in S617, and to the originating subscriber 122 in S618.

The initial IP version translation in S606 or return of the translated message in S608, the SBC 172, or MGCF, may transmit the built IPv4 invite for the Peer computing device 128 when receiving a 200 OK message in S612. That is, the SBC 172 or MGCF may be configured to translate between the SDP of the originating Peer computing device (e.g. IPv4) and the SDP of the host system destination computing device (e.g. IPv6).

Alternately, querying device, such as SBC 172, may utilize a DNS 140 lookup using a mapped FQDN. When the system receives a call from outside the host system to a computing device 122 associated with the IMS Core 110, a call invite message from the peer computing device 128 may be received by a querying device, such as SBC 172 or MGCF. The invite message may include a SDP of either IPv6 or IPv4. The querying device may perform query or a lookup procedure with the ENUM DB 164 with the TN to retrieve the FQDN of the IMS Core 110 servicing the destination computing device 122. The querying device, such as SBC 172, may then utilize a DNS 140 lookup using the mapped FQDN of the IMS Core 110 servicing the destination computing device TN to determine the IP address and IP version of the destination computing device 122. In keeping with steps S605-S608, the SBC 172 may then build an invite compatible with IPv4 or IPv6 that corresponds to the IP version of the destination computing device 122 associated with the IMS Core 110. This solution may be used to reduce the amount of tasks done by the ENUM DB 164 and IPI AS 163.

Figure 7:
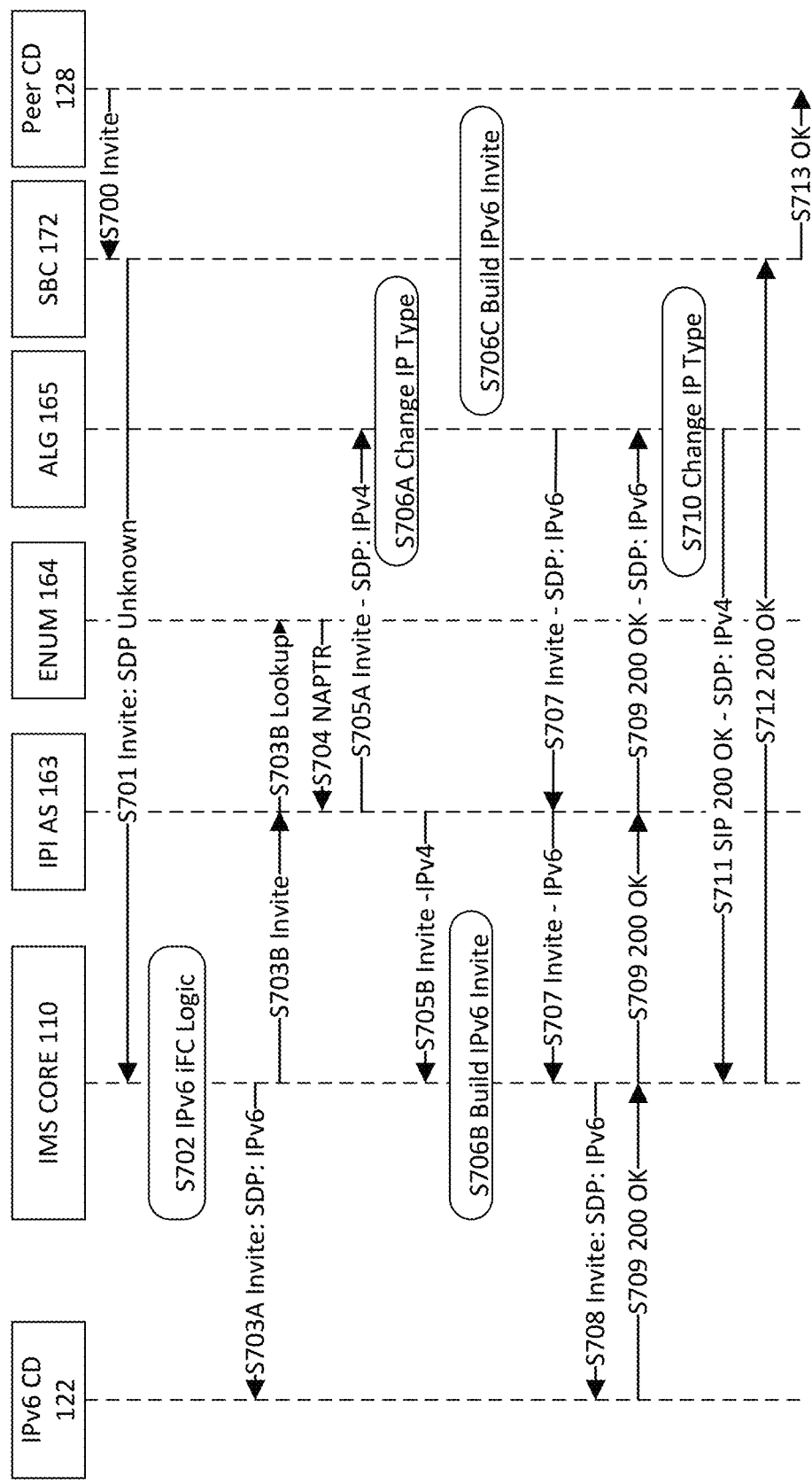
FIG. 7 shows an example chart showing message flows for an example method for IPv4 peer device interworking processing at the IMS Core with an IPv6 device.

The load on the ENUM DB 164 and IPI AS 163 may also be reduced by skipping any lookup operations determined to be unnecessary based on iFC logic operations of the IMS Core 110. As shown in FIG. 7, when processing an originating call from a peer computing device 128 that is outside the host system 100, an invite may be received by SBC 172, in step S700, and the invite may be transmitted the IMS Core 110 in step S701. The IMS Core 110 may be configured to inspect, in step S702, the data of the invite received to determine if any indicators in the received invite message that the originating computing device 128 transmitted the invite message using IPv6.

If indicators that the originating computing device 128 is using IPv6 are present, the IMS Core 110 may avoid unnecessary processing. Based on a determination by the iFC logic of the IMS Core 110, an element of the IMS Core 110, such as an S-CSCF 152, may provide additional processing or transmit the invite to the destination computing device 122. The iFC logic of the IMS Core 110 may inspect, in step S702, the iFC data of the invite received to determine if any indicators that the originating computing device 128 is using IPv6 are present. When indicators that the originating computing device 128 is using IPv6 are present, the IMS Core 110 may determine that the invite received in step S701 is compatible with the destination subscriber computing device 122. Based on that determination, the IMS Core 110 may determine no query or lookup processes directed to the IPI AS 163 or ENUM DB 164 may be necessary. When the iFC logic determines that indicators that the originating computing device 128 is using IPv6 are present, the invite received in S701 may be forwarded to the destination computing device 122 in step S703A. When the invite transmitted in step S703A is received by the destination computing device 122, the destination computing device 122 may responded with a SIP 200 OK messages via the IMS Core 110 and SBC 172 to the Peer computing device 128.

If no indicators that the originating computing device 128 is using IPv6 are present, the S-CSCF 152 may initiate, by control logic or an iFC, a query to the IPI AS 163 in S703B, in keeping with steps S501-S504 of FIG. 5 and S601-67 of FIG. 6. The query and lookup, step S703B, may be made by the S-CSCF 152 of the IMS Core 110. The IPI AS 163 may perform a lookup of the destination subscriber 122 in the ENUM DB 164 using the destination subscriber TN. The ENUM DB 164 may map the destination subscriber 122 TN to an IMS Core 110 Name Authority Pointer (NAPTR), and may return the NAPTR in a response message to the IPI AS 163, in step S704. Based on previously received third party registration messages, the IPI AS 163 may store or be configured with the mapping of NAPTR values to IPv4 or IPv6 protocol version for the target computing device's 120 associated IMS Core 110. Based on the NAPTR received by the IPI AS 163 in step S704, the IPI AS 163 may transmit a message to the ALG 165 for IP version translation in Step S705.

In step S706A, the ALG 165 may provide IP version translation for the invite message, in the same manner as S406. For example, the ALG 165 may provide SDP translation for the SIP invite message to the IP version of the destination subscriber. The ALG 165 may transmit, in S707, the translated SIP invite message to the IPI AS 163 and the IPI AS 163 may transmit the translated SIP invite message to the IMS Core 110.

In the absence of a translation by the ALG 165, the IPI AS 163 may transmit the NAPTR to the IMS Core 110 or SBC 172. For example, the NAPTR or an invite message indicating the IP version of the originating peer computing device 128 (e.g. IPv4 may be transmitted to either or both of the IMS Core 110 or SBC 172.

An element of the IMS Core 110, such as S-CSCF 152, may provide IP version translation for the invite message, in step S706B, to an IP version compatible with IP version of the IPv6 destination computing device 122. The SBC 172 may also provide IP version translation for the invite message, in step S706C, to an IP version compatible with IP version of the IPv6 destination computing device 122. If either an element of the IMS Core 110 or the SBC 172 are configured to provide IP version translation, any further messages, e.g. 200 OK messages, may be transmitted through whichever element provided the previous translation for future translation. For example, further messages may be transmitted through the SBC 172 for IP version translation before being transmitted to or from the IPv6 destination computing device 122 or the originating peer computing device 128.

When the ALG 165 has transmitted, in S707, the translated IPv6 SIP invite message to the IPI AS 163 and the IPI AS 163 may transmit the translated SIP invite message to the IMS Core 110. The translated IPv6 invite from step S707 may then transmitted to the destination subscriber 122 in step S708. Alternatively, a message translated by an element of the IMS Core 110, such as S-CSCF 152, in step 706B or the SBC 172 in step S706C may be translated by one of those elements from or via the IMS Core 110 to the destination subscriber 122 in step S708. After the IPv6 destination subscriber 122 receives the invited message in step S708, the destination subscriber 122 may transmit a 200 OK message in step S709 to the device that processed the message for IP version translation.

The destination subscriber 122, in step S709, may then transmit a confirmation message, such as a SIP 200 OK message. When the ALG 165 is the translating device, the 200 OK message transmitted from the destination subscriber 122 may be transmitted via the IMS Core 110 and via the IPI AS 163 to the ALG 165 for IP version translation, in step S710, back to the IP version of the originating peer computing device 128. After translation to the IP version of the originating peer computing device 128, the 200 OK message may be transmitted back to the originating peer computing device 128. When the ALG 165 is the translating device, the 200 OK message that back to the IP version of the originating peer computing device 128 (e.g. IPv4) may be transmitted back to IMS Core 110 in step S711. The 200 OK message may then be transmitted to the SBC 172 in step S712 and to the originating peer computing device 128 in step S713.

Figure 8:
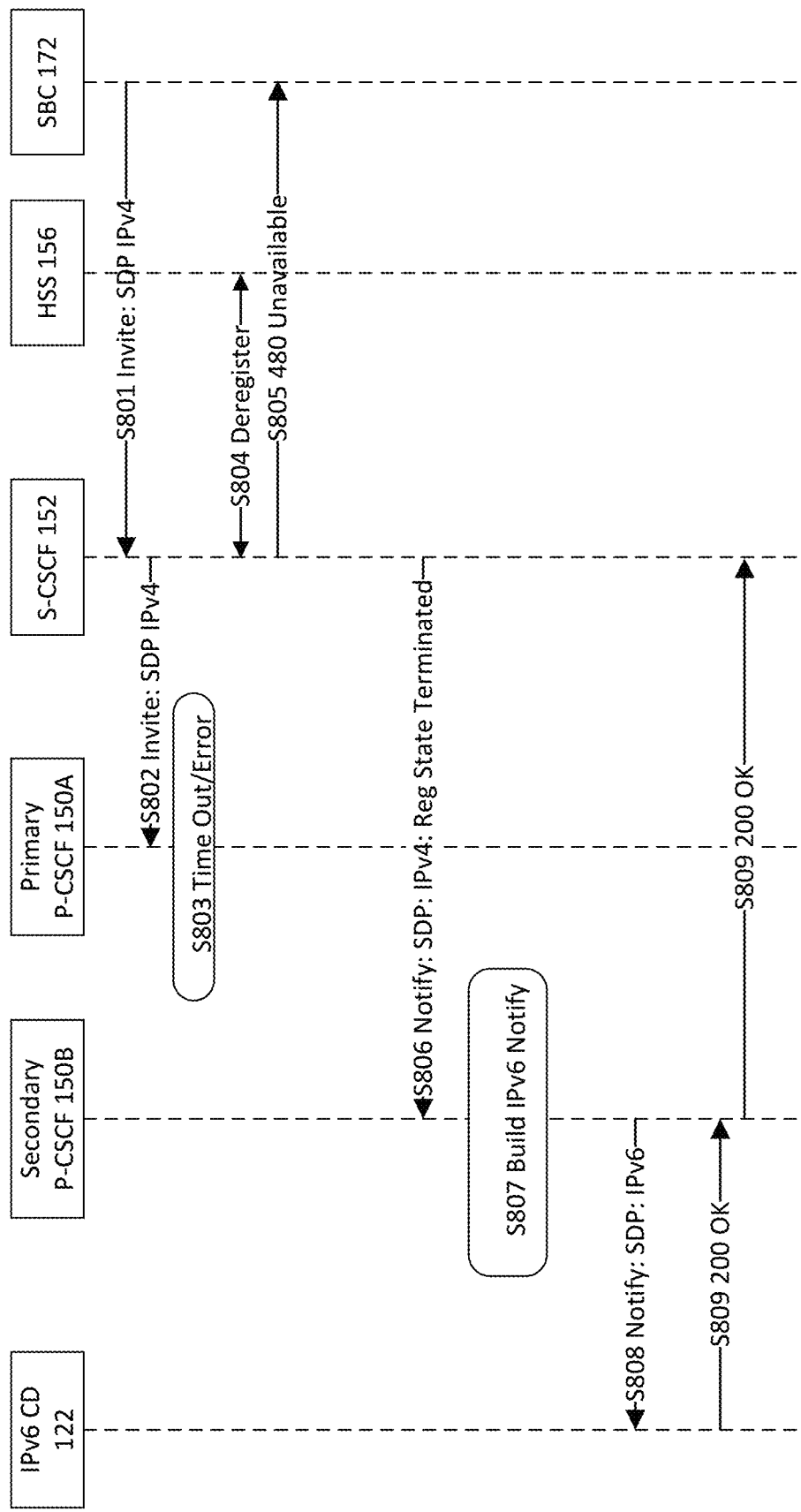
FIG. 8 shows an example chart showing message flows for an example method for device interworking processing based on IPv6 control logic in the IMS Core.

The IMS Core 110 may also be configured to handle messages, without a query or lookup processes directed to the IPI AS 163 or ENUM DB 164, based on message processing. As shown in FIG. 8, an IPv4 call invite message may be received by an edge network device, such as SBC 172 or a MGCF. To lessen the load on the ENUM DB 164 and IPI AS 163. In step S801, the invite message may be transmitted to the S-CSCF 152. To reduce invite processing operations, the S-CSCF 152 may transmit the IPv4 invite to the primary P-CSCF device 150A. The transmission of the IPv4 invite to the primary P-CSCF device 150A may be made after receipt of the invite from the SBC 172, and without further processing to determine whether the invite message may include a SDP of either IPv6 or IPv4.

When the primary P-CSCF device 150A and destination computing device 122 are compatible with the invite transmitted in steps S801-S802, the invite may be transmitted to the destination computing device 122 without further processing. When the primary P-CSCF device 150A and/or destination computing device 122 are not compatible with the invite transmitted in steps S801-S802, the primary P-CSCF device 150A may respond, in step S803, to the invite with an error message. Alternatively, when the primary P-CSCF device 150A and/or destination computing device 122 are not compatible with the invite transmitted in steps S801-S802, the primary P-CSCF device 150A may not respond, in step S803, resulting in a timeout or respond with a message indicating a timeout. The S-CSCF 152 may determine, based on an error message or time out, that the invite was not successful, and additional processing may be necessary for the call to proceed.

In step S804, S-CSCF 152 may deregister through Server-Assignment-Request (SAR) and Server-Assignment-Answer (SAA) the subscriber with the HSS 156. In step S805, S-CSCF 152 may also respond to the originating SBC 172 with a message indicating that the primary P-CSCF device 150A did not respond or is not available, such a SIP 480 Temporarily Unavailable message.

The S-CSCF 152 may then generate and transmit a message, in step S806, to be transmitted to a secondary P-CSCF device 150B indicating the deregistration of the user. For example, the S-CSCF 152 may transmit a SIP Notify message. The message may be in the IPv4 format, and may provide an event indicator indicating that the registration status has been terminated. The notification message may be transmitted to the secondary P-CSCF device 150B in IPv6 format.

After receiving the notification message, the secondary P-CSCF device 150B may translate, in step S807, an IPv6 message to be transmitted to the destination computing device 122. Step S807 may involve transmitting additional messages to the ALG 165 to translate a message. The message may be provide an event indicator indicating that the registration status has been terminated and may be transmitted, in step S808, to the destination computing device 122. The destination IPv6 computing device 122 may respond with a confirmation message, such a SIP 200 OK message, in step S809. The confirmation message may be forwarded to the S-CSCF 152. As the destination computing device 122 registration status has been terminated, the destination IPv6 computing device 122 may determine the need to initiate a registration process in keeping with the discussion above and as depicted in FIG. 3.

Figure 9:
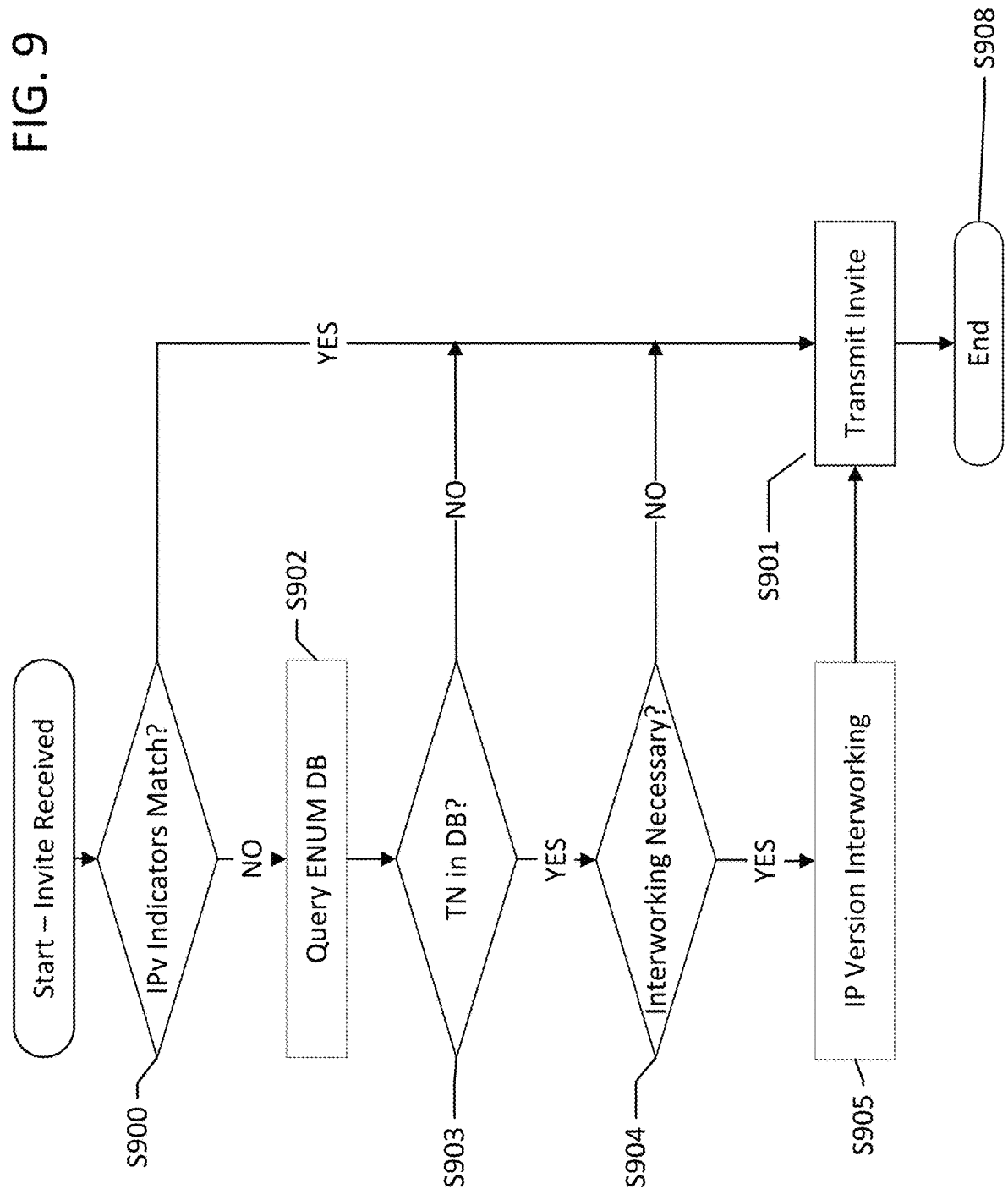
FIG. 9 shows an example flowchart for an example method for processing invite messages.

FIG. 9 depicts a flowchart for processing invite messages. When an invite message is received at a network element, such as S-CSCF 152 or another querying element, the network element may determine, in step S900, if any IPv4 or IPv6 indicators are present in the invite message. The network element may also determine, based on message indicators, whether the IP versions of the message and the intended destination of the message match. These determinations may be made based on iFC logic of the querying element.

If it may be determined that the IP version indicators match in step S900, the invite may be transmitted to the destination computing device in step S901. The determination of matching IP versions indicates to the network element that no additional IP version processing is necessary for successful call termination. If it determined that no protocol indicators are found or if it is determined that the protocol indicators do not indicate an IP version match in step S900, the process may proceed to query the IPI AS and/or EMUM DB in step S902. The query in step S902 may proceed in keeping with steps S401-S405 of the process described above with regards to FIG. 4.

When it is determined that a query may be needed, a network element, such as S-CSCF 152 or SBC 172, may initiate a query, in step S902, the IPI AS 163 and/or ENUM DB 164. The query may be made in keeping with steps S501-S504 of FIG. 5 and S601-67 of FIG. 6. Based on the information returned from the query in step S902, the system may determine if the TN may be found in the ENUM DB 164, in step S903. An off network telephone number may not be stored in the ENUM DB 164. Based on a determination that the TN is not found, the invite may be transmitted to the destination computing device, without further processing, in step S901.

Based on a determination that the TN is found in the ENUM DB 164, the IPI AS 163 may determine if IP version translation processing or other interworking processing may be necessary in step S904. It is determined that the IP version indicators match in step S904, no further processing or IP version interworking may be necessary. As such, the invite may be transmitted to the destination computing device 120 in step S901.

If it is determined that the IP version indicators do not match in step S904, further processing or IP version translation or interworking may be necessary in step S905. As such, the invite may undergo additional processing for interworking between IP versions. For example, an IPv4 message may be processed before being transmitted to the destination computing device 120 in step S901. The IPv4 message may be transformed, in step S905, into an IPv6 format before transmission to the destination computing device 120 in step S901. When the IP version of the invite message has been translated, as necessary, and transmitted the intended recipient computing device. The system may also maintain a record of the IP version of the active user devices transmitting messages in order to provide any additional necessary IP version translations such that other messages associated with initial invite are processed without unnecessary queries to the IPI AS 163.

For the IPI AS 163 to maintain valid data, a plurality of IPI application servers may be provisioned as nodes of a server cluster. To guard against application, service, system, or hardware failures, each IPI AS 163-N may communicate with the other IPI application servers, over network 180, in the cluster to maintain redundant and up to date data for the computing devices 120 registered with any IPI AS. Each node of the cluster may communicate with the other nodes to perform load balancing of computing devices 120 across the CSCF elements. Each IPI AS 163 operates as an independent device in the manner described above.

Figure 10:
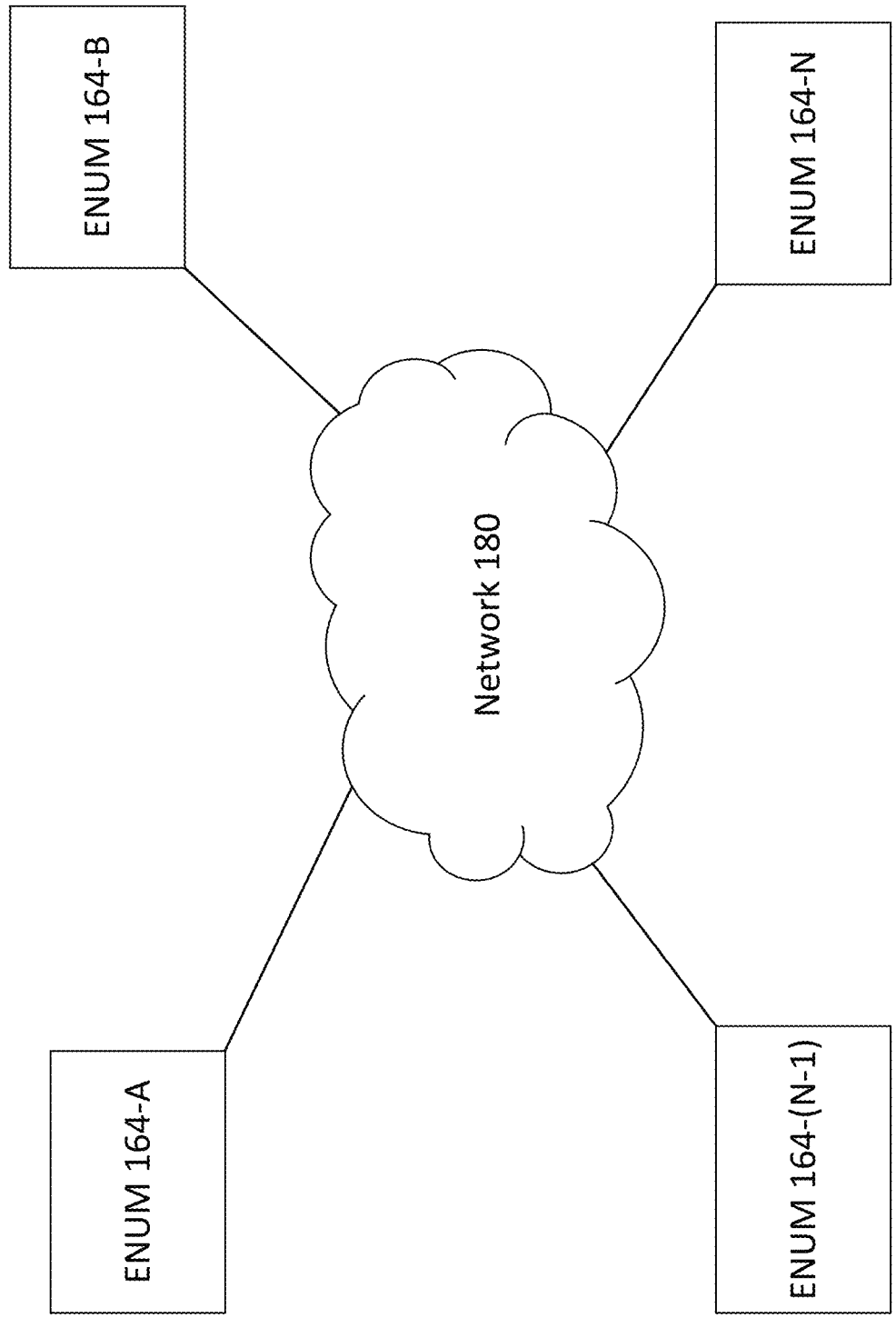
FIG. 10 shows an example ENUM device network cluster architecture.

As depicted in FIG. 10, a plurality of IPI AS 163-A through 163-N may be interconnected via a wide area network (WAN) 180, such as the Internet. Each IPI AS 163-N may be associated with a particular IMS Core 110, and may transmit periodic updates regarding the known IP version types associated with particular devices to the other ENUM application servers. As such, each IPI AS 163-N may maintain a copy of the data stored in ENUM DB 164. With this information sharing, each IPI AS 163 may lookup the IP version type associated with different devices. As such, each computing device 120 may be routed through an appropriate IMS Core 110.

Figure 11:
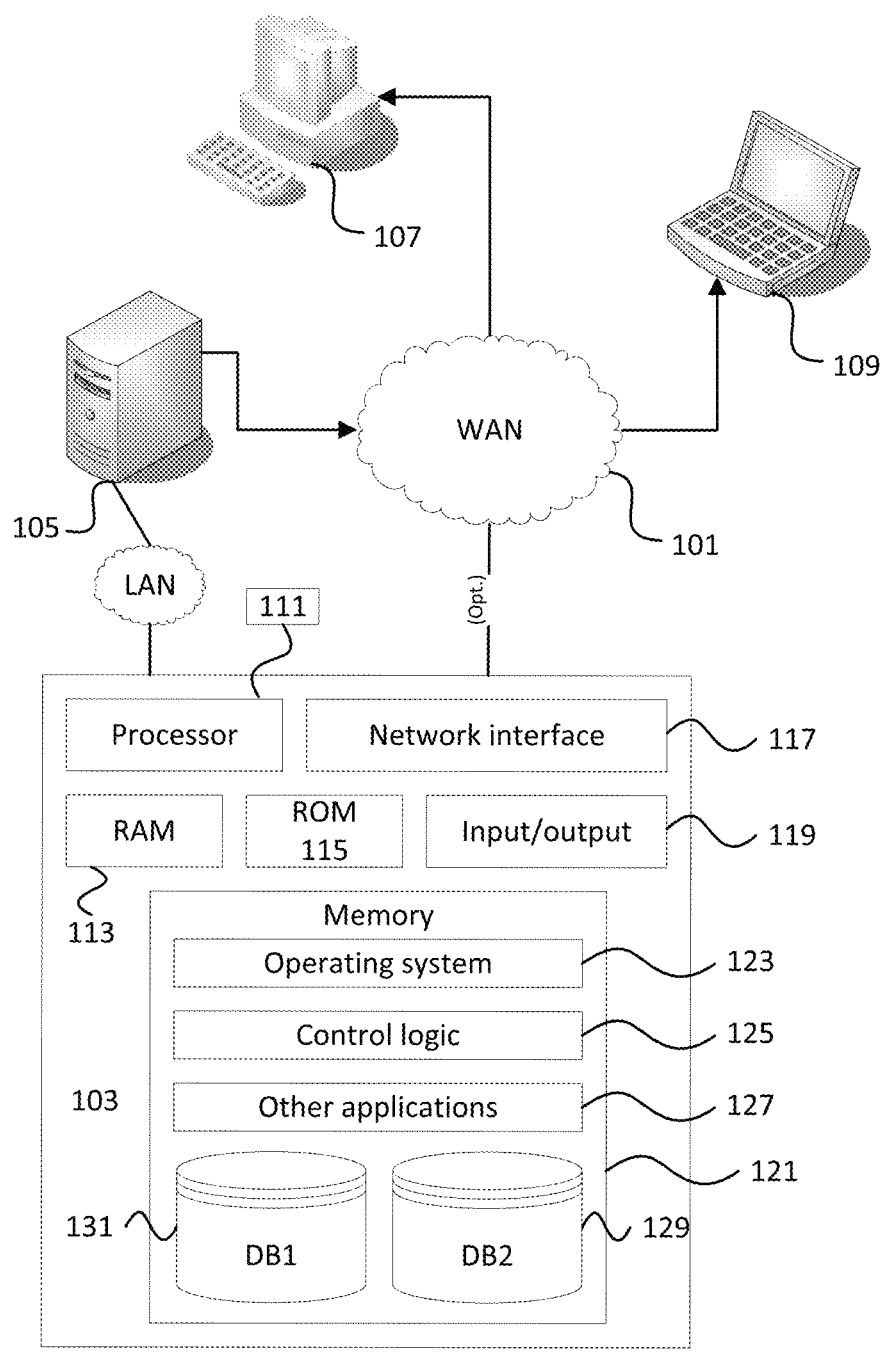
FIG. 11 shows an example device architecture.

As depicted in FIG. 11, each component 140, 150, 152, 154, 156, 160, 163, 164, 165 and 170 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. The functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures may be contemplated within the scope of computer executable instructions and computer-usable data described herein.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
  receiving, by a call session control function (CSCF) device, a call message comprising user device identification information of a target user device and an Internet Protocol (IP) version indicator of an originating user device;
  determining an IP version of the target user device by querying, by the CSCF device, a session description mapping table with the user device identification information of the target user device;
  determining, based on the IP version indicator of the originating user device and the IP version of the target user device, whether IP version interworking is necessary;
  building, based on a determination of whether IP version interworking is necessary, an interworking call message based on session description information associated with the target user device; and
  sending the interworking call message to the target user device.

2. The method of claim 1,
  wherein the session description mapping table comprises an E.164 Number to Uniform Resource Identifier (URI) Mapping (ENUM) table; and
  wherein the session description information associated with the target user device comprises a Name Authority Pointer (NAPTR) specific to either IP Version 4 (IPv4) or IP Version 6 (IPv6).

3. The method of claim 1, wherein the user device identification information comprises a telephone number (TN) from the call message.

4. The method of claim 1, further comprising causing, by the CSCF device and based on an initial filter criteria (iFC), the user device identification information to be stored by an application server associating the user device identification information of a user device with an Internet Protocol (IP) version of the user device.

5. The method of claim 1, wherein the session description mapping table maps a telephone number (TN) to a fully qualified domain name (FQDN).

6. The method of claim 1, wherein the determining whether the IP version interworking is necessary further comprises:
  determining an IP version of the call message; and comparing the IP version of the call message with the IP version of the target user device.

7. The method of claim 1, further comprising:
receiving, by the CSCF device, a registration message; and
updating, based on the registration message received by the CSCF device, the session description mapping table with user identification information of the registration message.

8. A method comprising:
receiving, by a computing device, a registration message comprising:
user device identification information of a user device, and
session description information associated with the user device;
sending, by the computing device and to an application server storing a session description mapping table, the user device identification information of the user device and the session description information associated with the user device;
receiving a call message comprising target user device identification information of a target user device and an Internet Protocol (IP) version indicator of the user device;
determining an IP version of the target user device by querying the session description mapping table with the target user device identification information of the target user device;
determining, based on the IP version indicator of the user device and the IP version of the target user device, whether IP version interworking is necessary;
building, based on a determination of whether IP version interworking is necessary, an interworking call message based on session description information associated with the target user device; and
sending the interworking call message to the target user device.

9. The method of claim 8, wherein the session description mapping table comprises an E.164 Number to Uniform Resource Identifier (URI) Mapping (ENUM) table;
wherein the session description information associated with the user device comprises a Name Authority Pointer (NAPTR) specific to either IP Version 4 (IPv4) or IP Version 6 (IPv6); and
wherein the user device identification information comprises a telephone number (TN) from the registration message.

10. The method of claim 8, wherein the building, based on the determination of whether IP version interworking is necessary, the interworking call message further comprises generating, by the computing device and based on a determination that the session description information associated with the target user device is different than session description information of the call message comprising the target user device identification information, a second call invite message using the IP version of the target user device.

11. The method of claim 8, wherein the session description mapping table maps a telephone number (TN) to a fully qualified domain name (FQDN).

12. The method of claim 8, wherein the determining whether the IP version interworking is necessary further comprises:
determining an IP version of the call message; and
comparing the IP version of the call message with the IP version of the target user device.

13. The method of claim 8, wherein the sending the user device identification information of the user device and the session description information associated with the user device further comprises:
updating, based on a determination that the user device identification information of the registration message was previously stored in the session description mapping table, the session description mapping table with user identification information of the registration message.

14. An apparatus comprising:
one or more processors; and
memory storing computer-readable instructions that, when executed by the one or more processors, cause the apparatus to:
receive a call message comprising user device identification information of a target user device and an Internet Protocol (IP) version indicator of an originating user device;
determine an IP version of the target user device by querying a session description mapping table with the user device identification information of the target user device;
determine, based on the IP version indicator of the originating user device and the IP version of the target user device, whether Internet Protocol (IP) version interworking is necessary;
build, based on a determination that IP version interworking is necessary, an interworking call message based on session description information associated with the target user device; and
send the interworking call message to the target user device.

15. The apparatus of claim 14, wherein the session description mapping table comprises an E.164 Number to URI Mapping (ENUM) table; and
wherein session description information associated with the target user device comprises a Name Authority Pointer (NAPTR) specific to either IP Version 4 (IPv4) or IP Version 6 (IPv6).

16. The apparatus of claim 14, wherein the user device identification information comprises a telephone number (TN) from the call message.

17. The apparatus of claim 14, wherein the computer-readable instructions, when executed by the one or more processors, further cause the apparatus to:
cause, based on an initial filter criteria (iFC), the user device identification information to be stored by an application server in the session description mapping table, wherein the session description mapping table comprises an entry that associates the user device identification information with the Internet Protocol (IP) version of the target user device.

18. The apparatus of claim 14, wherein the session description mapping table maps a telephone number (TN) to a fully qualified domain name (FQDN).

19. The apparatus of claim 14, wherein the computer-readable instructions, when executed by the one or more processors, cause the apparatus to determine whether Internet Protocol (IP) version interworking is necessary by:
determining an IP version of the call message; and
comparing the IP version of the call message with the IP version of the target user device.

20. The apparatus of claim 14, wherein the computer-readable instructions, when executed by the one or more processors, further cause the apparatus to:
receive a registration message; and update, based on the received registration message, the session description mapping table with user identification information of the registration message.

* * * * *

UNITED STATES PATENT AND TRADEMARK OFFICE
CERTIFICATE OF CORRECTION

| | |
|---|---|
| PATENT NO. | : 11,019,111 B2 |
| APPLICATION NO. | : 16/205516 |
| DATED | : May 25, 2021 |
| INVENTOR(S) | : Wikoff et al. |

It is certified that error appears in the above-identified patent and that said Letters Patent is hereby corrected as shown below:

On the Title Page

Column 2, (57) Abstract, Line 4:
Delete "may use may use" and insert --may use-- therefor In the Specification Column 1, Background, Line 27:
After "time.", insert --¶--

Column 10, Detailed Description, Line 41:
Delete "166" and insert --156-- therefor Column 11, Detailed Description, Line 4:
Delete "S1-23" and insert --S1-S23-- therefor Column 11, Detailed Description, Line 10:
Delete "S-SCCF" and insert --S-CSCF-- therefor Column 12, Detailed Description, Line 6:
Delete "in in" and insert --in-- therefor Column 14, Detailed Description, Line 22:
Delete "in in" and insert --in-- therefor Column 15, Detailed Description, Line 59:
Delete "S601-67" and insert --S601-S607-- therefor Column 16, Detailed Description, Line 46:
Delete "706B" and insert --S706B-- therefor Signed and Sealed this
Fourteenth Day of March, 2023

Katherine Kelly Vidal
*Director of the United States Patent and Trademark Office*

Column 18, Detailed Description, Line 27:
Delete "S601-67" and insert --S601-S607-- therefor Column 20, Detailed Description, Lines 14-15:
After "manner", insert --.--